United States Patent [19]

Shotmeyer

[11] Patent Number: 4,901,748
[45] Date of Patent: Feb. 20, 1990

[54] FILLING STATION STRUCTURE

[76] Inventor: Albert Shotmeyer, 1 Valley St., Hawthorne, N.J. 07506

[21] Appl. No.: 611,986

[22] Filed: May 18, 1984

[51] Int. Cl.<sup>4</sup> ............................................. B60S 5/02
[52] U.S. Cl. ................................. 137/234.6; 137/357
[58] Field of Search ............ 137/124, 142, 147, 234.6, 137/356, 357, 358, 362; 220/1 B, 85 S; 141/94, 98; 52/169.2, 174

[56] References Cited

U.S. PATENT DOCUMENTS

| | | | |
|---|---|---|---|
| 1,168,717 | 1/1916 | Flint | 137/234.6 |
| 1,696,954 | 1/1929 | Hayes | 137/147 X |
| 2,021,544 | 11/1935 | Crown | 137/234.6 X |
| 3,384,132 | 5/1968 | Lisciani | 137/147 X |
| 3,642,036 | 7/1972 | Ginsburgh | 141/94 |
| 4,263,945 | 4/1981 | VanNess | 137/234.6 X |

FOREIGN PATENT DOCUMENTS 0090468  10/1983  European Pat. Off. ............ 220/1 B Primary Examiner—John Rivell
Attorney, Agent, or Firm—Foley & Lardner, Schwartz, Jeffery, Schwaab, Mack, Blumenthal & Evans

[57] ABSTRACT

A filling station structure includes a canopy for covering a vehicle refueling area. A pair of fuel storage vessels are elevated above the ground and contain separate tanks for holding fuel to be dispensed to the vehicles. The fuel storage vessels are contiguous with the canopy to form an integrated, covered filling station with above-ground, elevated tanks.

20 Claims, 9 Drawing Sheets

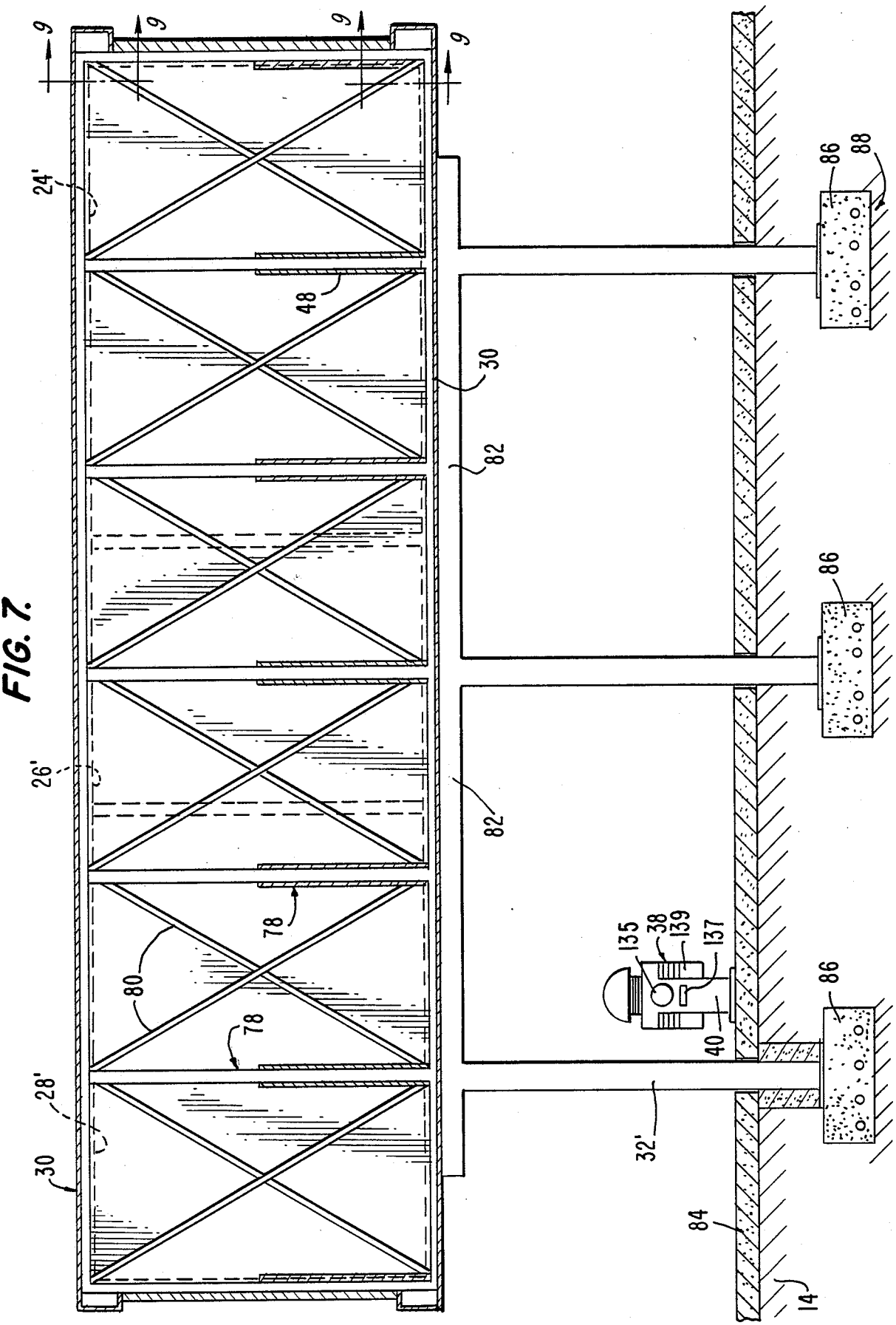

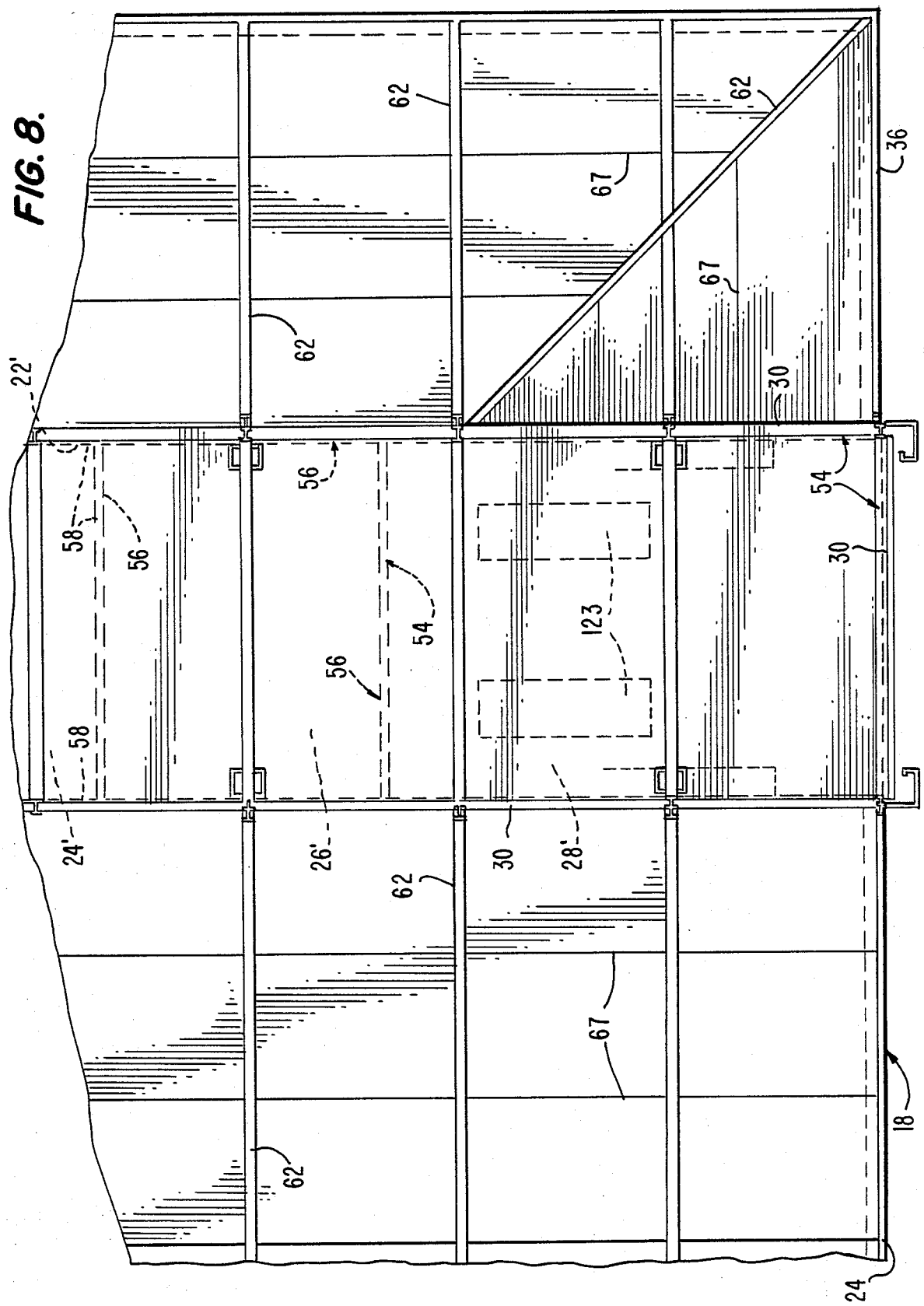

FILLING STATION STRUCTURE

BACKGROUND OF THE INVENTION

1. Field of the Invention

The present invention relates to a filling station structure, and particularly to the type of filling station structure which is characterized by a canopy, the covering pump islands, and the refueling areas of a filling station, with the human attendant being in one or more kiosks on the pump island.

2. Description of the Prior Art

The conventional and virtually universally accepted method of storing and dispensing motor fuel from filling stations involves the use of underground storage tanks from which fuel is pumped, by a combination pump and dispensing unit, into the tanks of motor vehicles. This method is, however, subject to a number of drawbacks and disadvantages, one of which is the hazard of fuel leaks from the underground storage tanks and pipes which, in turn, may lead to serious contamination of the environment. For instance, the fuel may contaminate ground water used for drinking. The use of underground fuel storage tanks for filling stations poses a public health hazard, and the leakage problem is a major concern of the United States Environmental Protection Agency.

3. Objects of the Invention

It is accordingly an object of the invention to overcome the disadvantages, drawbacks and dangers of the conventional filling station fuel storage systems and to provide a practical, safe, attractive and economical above-ground fuel storage system.

It is a further object of the invention to provide an above-ground fuel storage system in a type of filling station which utilizes a canopy over the refueling areas used by motorists.

It is yet another object of the invention to provide an above-ground fuel storage system in which the vessels and tanks for storing the fuel are incorporated into a canopy which extends over the refueling area.

It is a related object of the invention to provide a filling station structure in which compartments containing fuel tanks are part of and integral with an overall canopy assembly.

It is yet another related object of the invention to provide a filling station structure in which vessels for holding the fuel tanks also support the canopy and in which, from another perspective, the canopy also serves both to cover the refueling area and to provide the structure for the storage of fuel.

It is another object of the invention to provide a filling station structure which eliminates the need for any pumps for moving fuel from the fuel storage tanks to the customer's vehicle.

It is a related object of the invention to provide a filling station structure in which fuel is dispensed to the customer's vehicle from the fuel storage tanks by a siphoning action.

It is still a further object of the invention to provide a filling station structure with above-ground fuel storage tanks in which the danger of fire is kept to an absolute minimum.

Other objects, features and advantages of the present invention will become more apparent from the following description and from the accompanying drawing.

SUMMARY OF THE INVENTION

The foregoing objects, features and advantages of the present invention are accomplished by providing a filling station structure which has a canopy for covering an area for refueling vehicles, the canopy being disposed above ground level and above the level of the vehicles to be refueled, the filling station structure also having at least one elevated, above-ground fuel storage vessel holding fuel to be dispensed to the vehicles, the fuel storage vessel being contiguous with the canopy. Thus, the canopy and the above-ground fuel storage vessels together form an integrated, covered, above-ground filling station. The only fuel storage for the filling station of the present invention is via one or more elevated, above-ground vessels. That is, all fuel storage is above ground, and there are no underground tanks or vessels.

Each fuel storage vessel includes a compartment with a plurality of different fuel tanks disposed therewithin. Thus, different types of fuels may be stored and dispensed from one storage vessel via the different fuel tanks. The compartment which houses the tanks is insulated and serves as a firewall in the event of a leak in any one tank. A plurality of fuel dispensers in the form of robots are disposed under each storage vessel. At least one siphon line extends between the storage vessel and fuel dispensers to feed fuel to the fuel dispensers by a siphoning action.

BRIEF DESCRIPTION OF THE DRAWINGS

FIG. 7 is a sectional view taken on line 7—7 of FIG. 6 and shows the truss structure of a fuel storage vessel;

FIG. 8 is a fragmentary plan view of the lower right quarter of the canopy frame of FIG. 4;

DETAILED DESCRIPTION

Figure 1:
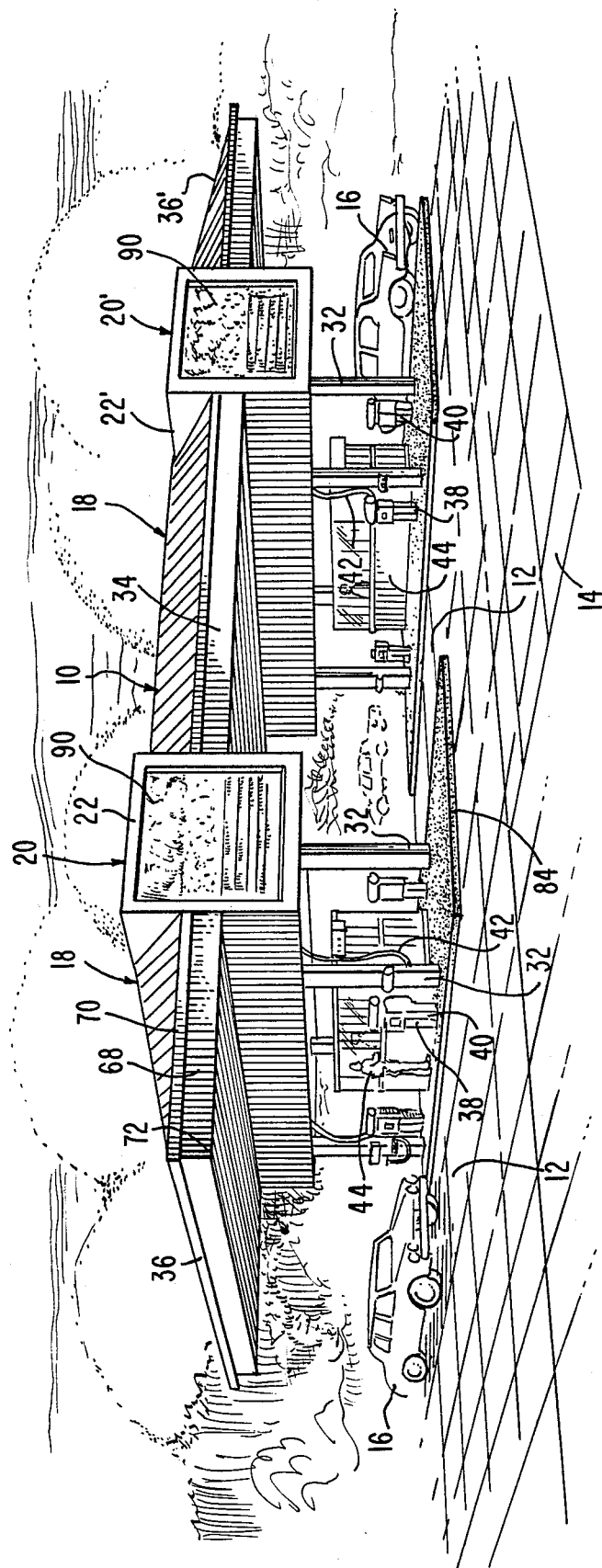
FIG. 1 is a perspective view of a filling station structure according to the present invention.

In the following description, and in the drawing, like reference characters, as used among various different figures, refer to like elements or features.

Figure 2:
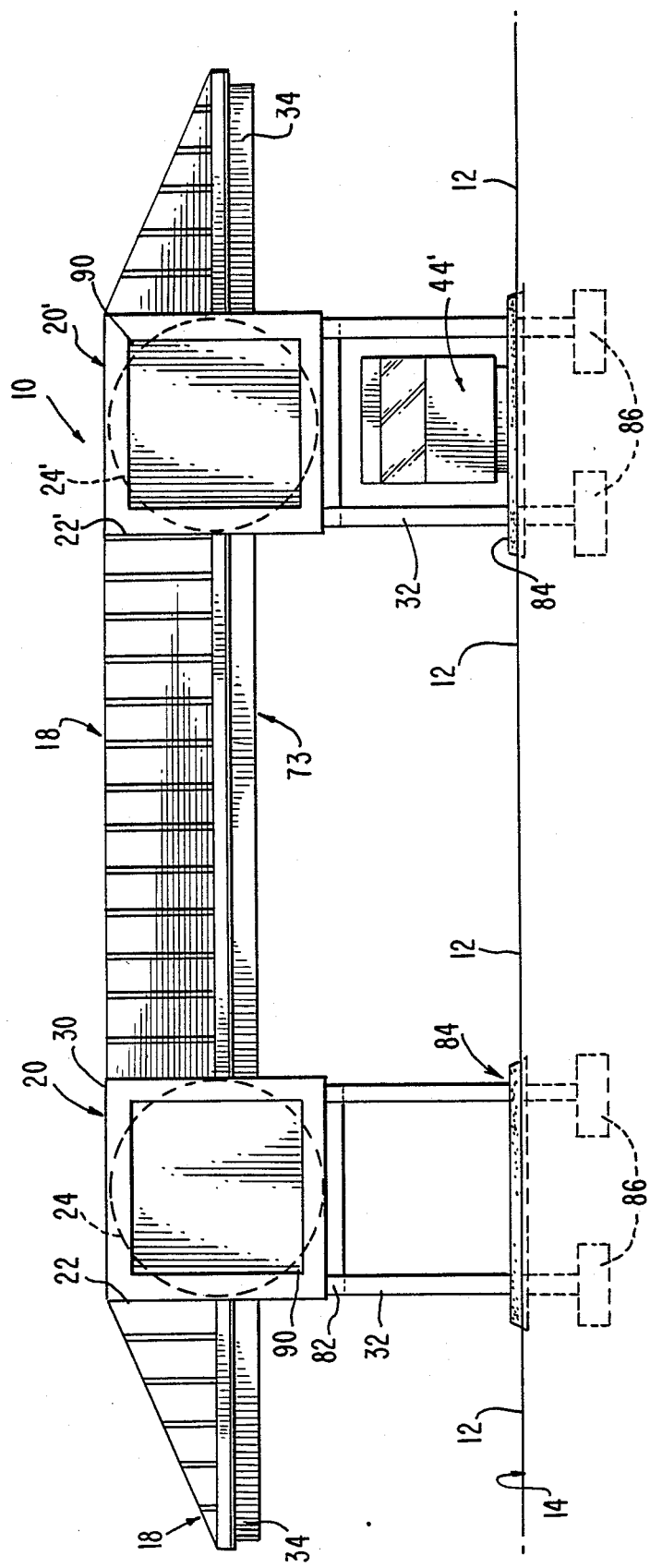
FIG. 2 is a front elevational view of the filling station structure of FIG. 1.
Figure 3:
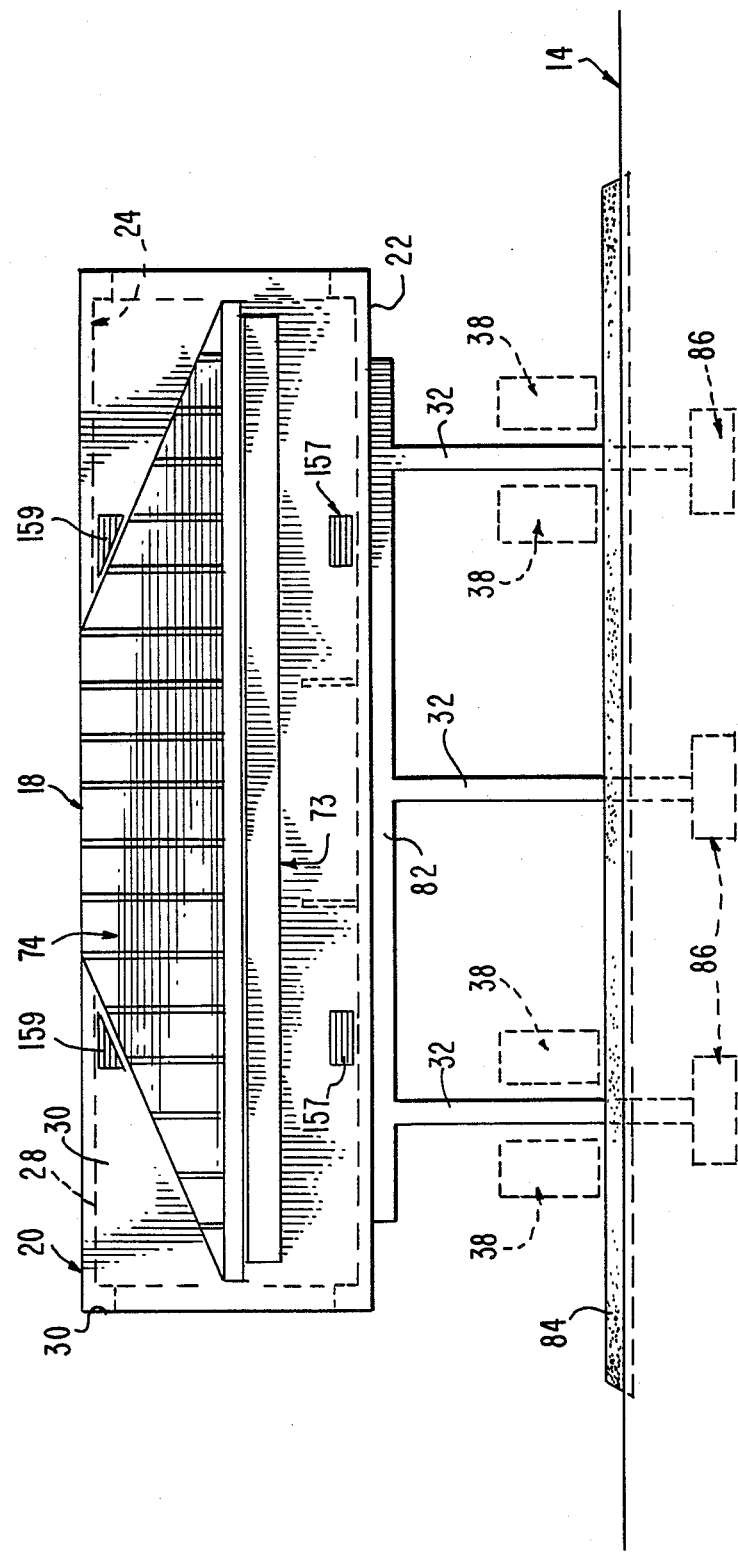
FIG. 3 is an end elevational view of the filling station structure of FIG. 2.

Referring to FIGS. 1–3, the specific embodiment of a filling station structure depicted in the drawing is referred to generally by reference character 10. Filling station structure 10 includes an area 12 which is at ground level 14 for refueling motor vehicles 16. A canopy 18 covers refueling area 12, i.e., covers the area 12 for refueling vehicles 16. Of course, canopy 18 is disposed above the level of the vehicles to be refueled.

In the particular embodiment depicted and described herein, there are, by way of example, a pair of spaced-apart, above-ground fuel storage vessels 20, 20' for holding fuel to be dispensed to the vehicles 16. The fuel storage vessels 20, 20', which are elongated and arranged in mutually parallel disposition, are also contiguous with the canopy, so that the canopy and above-ground fuel storage vessels together form an integrated, covered, above-ground filling station. The elevated canopy 18 adjoins the fuel storage vessels 20, 20' and is supported by them. Canopy 18 extends from storage vessels 20, 20' over refueling area 12 at a level such that canopy 18 is disposed over motor vehicles 16 in the refueling areas 12. That is, canopy 18 provides a roof over the motor vehicles.

Fuel storage vessels 20, 20' define, respectively, compartments 22, 22'. Each compartment 22, 22' contains a set of fuel tanks which provide chambers in the vessels 20 for different types of fuels, such as regular unleaded gasoline, premium unleaded gasoline, regular leaded gasoline or, perhaps, diesel fuel. In the specific embodiments shown, each vessel 20, 20' includes three different fuel storage tanks, i.e., two relatively large tanks for the most popular fuels and one relatively small tank for less popular fuels. Specifically, vessel 20 contains in its compartment 22 a first relatively large fuel tank 24, a second relatively small fuel tank 26, and a third relatively large fuel tank 28, the smaller tank 26 being disposed between the two larger tanks 24, 28. Likewise, vessel 20' contains in its compartment 22' a first relatively large fuel tank 24', a second relatively small fuel tank 26', and a third relatively large fuel tank 28', the smaller tank 26' being disposed between the two larger tanks 24', 28'.

The larger fuel tanks, namely, tanks 24, 24', 28, 28', are preferably 8,000 gallon tanks, and the smaller tanks, namely, tanks 26, 26', are preferably 6,000 gallon tanks. Thus, the compartment 22, 22' of each vessel 20, 20' will hold three tanks, preferably with a total capacity of 22,000 gallons. The tanks 24, 24', 26, 26', 28, 28' are preferably constructed of steel and are preferably cylindrical in shape. These are standard, readily commercially available tanks. It is, of course, apparent in this regard that each storage vessel 20, 20', with its tanks 24, 24', 26, 26', 28, 28' is of sufficient size and capacity to contain a volume of motor fuel adequate for refueling multiple motor vehicles as is customary for filling stations. All access to the tanks are through openings in the tops of the horizontally disposed tanks. That is, there are no openings in the bottoms of the tanks.

Each vessel 20, 20' and the compartment 22, 22' defined thereby preferably is rectangular in shape when considered in lengthwise cross section and square in shape when considered in transverse cross section. That is, they are made up of rectangular and square walls 30. Walls 30 will be insulated, so that they serve as firewalls in the event of any leakage from the tanks 24, 24', 26, 26', 28, 28'.

Figure 4:
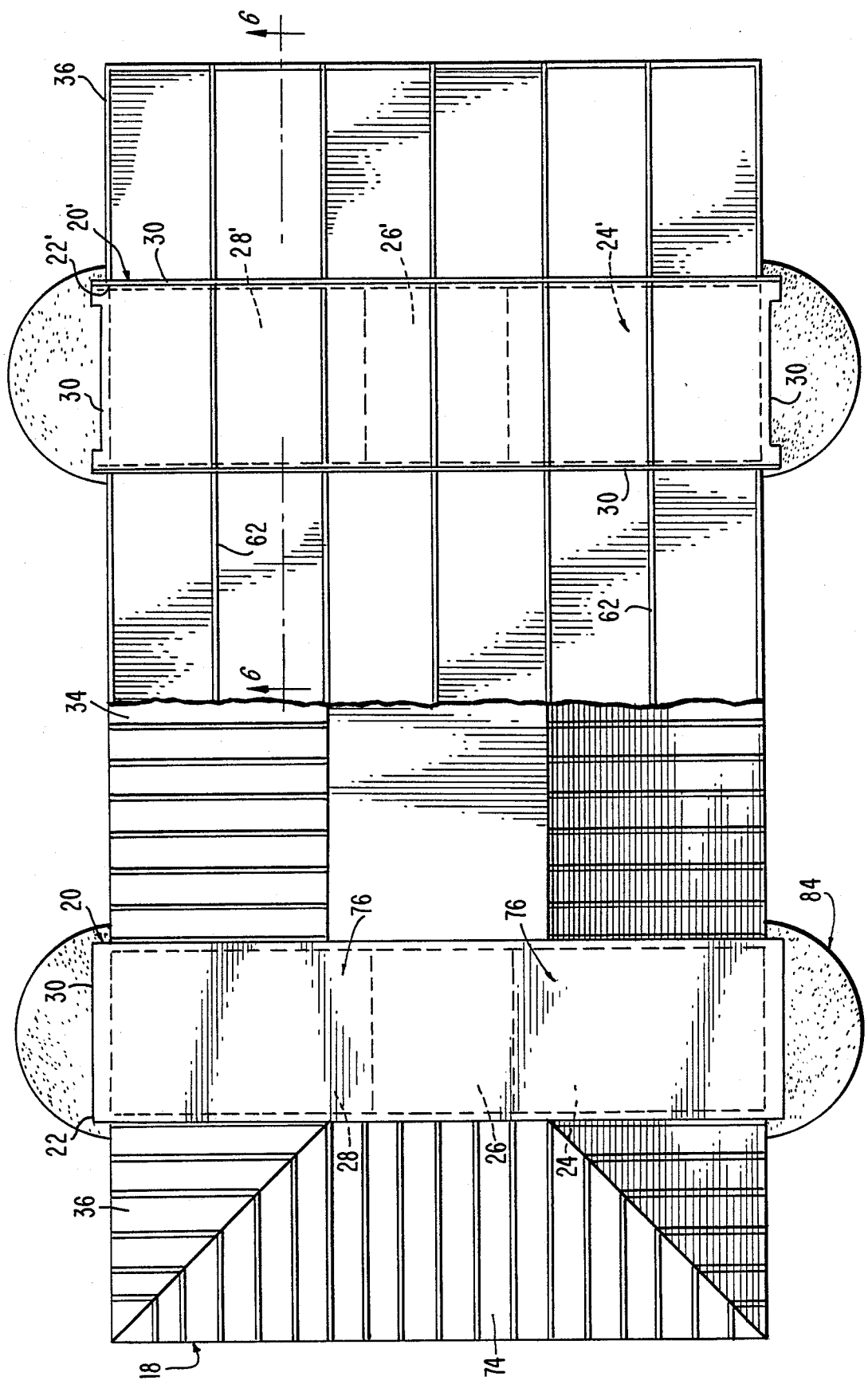
FIG. 4 is a plan view of the filling station structure of FIG. 2 with a portion of the roof removed to show its truss structure.

As will be apparent from the drawing, the vessels 20, 20' which contain the tanks 24, 24', 26, 26', 28, 28', are incorporated into the canopy 18 which extends over the refueling area 12. That is, the vessels 20, 20' and the compartments 22, 22' defined thereby are part of and integral with the total canopy assembly. On the one hand, the vessels 20, 20' do double duty by providing the compartments for containing the fuel tanks 24, 24', 26, 26', 28, 28' and by supporting the canopy. That is, vessels 20, 20' perform part of the covering function of the canopy. Looked at from another perspective, the canopy 18 does double duty by serving to cover the refueling area 12 and also by providing the structure for the storage of fuel. It will be readily apparent from the drawing, particularly FIG. 4, that each vessel 20, 20' is of a length which is at least as great as the width of the canopy 18.

Legs 32, 32' support vessels 20, 20', respectively, above the ground in their elevated positions. One part, namely, a center part 34, of the canopy 18 extends between the elevated vessels 20, 20' and, of course, is supported thereby in an elevated position. Other parts, i.e., side wings 36 of canopy 18, extend from the elevated vessels 20, 20' in cantilevered fashion. Of course, wings 36 are also supported in their elevated positions by vessels 20, 20'.

A plurality of fuel dispensers, generally referred to by reference character 38, which specifically take the form of robots 40, are disposed under each of the storage vessels 20, 20'. Siphon lines 42 extend between storage vessels 20, 20' and the fuel dispensers 38 to feed fuel to the dispensers through a siphoning action. Also, an attendant's booth or kiosk 44, 44' is disposed under one or both of the storage vessels 20, 20'.

The fuel tanks, i.e., tanks 24, 26 and 28 in compartment 22 of vessel 20 and tanks 24', 26' and 28 in compartment 22', rest on saddles 48 (FIG. 6) disposed in the respective compartments 22, 22'. Each saddle is disposed adjacent the floor 50 of one of the compartments, the floor 50 in each instance constituting one of the walls 30 of compartments 22 or 22'. Struts 52 extend from the bottom corners of the compartments 22, 22' to support the arcuately shaped saddles 48 in positions for holding fuel tanks 24, 24', 26, 26', 28, 28'. Saddles 48 hold the fuel tanks in such positions such that, in a plan view, the edges of the tanks will closely adjoin each other and will closely adjoin the walls 30 of the associated compartment. As will be seen from FIG. 8, edges 54 of tank 28' closely adjoin walls 30 of the compartment as well as one edge 56 of tank 26'. In turn, the other edges 56 of tank 26' are disposed closely adjacent to walls 30 of the compartment 22' and one wall 58 of tank 24'. Similarly, the remaining edges 58 of tank 24' closely adjoin walls 30 of compartment 22'.

Figure 10:
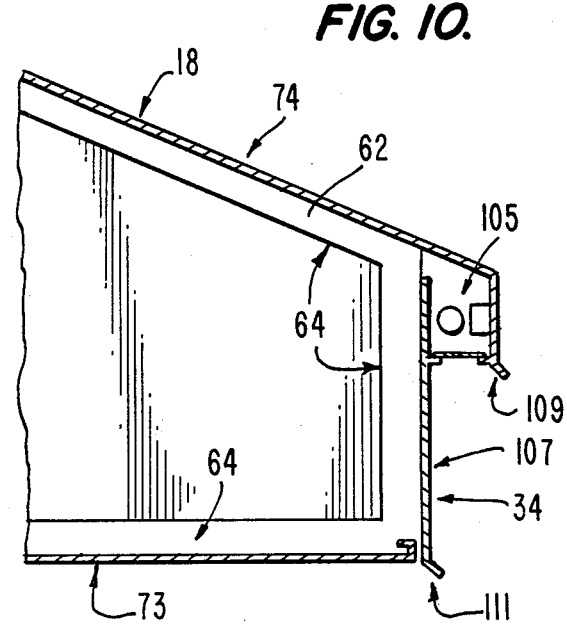
FIG. 10 is a fragmentary sectional view taken on line 10—10 of FIG. 6.
Figure 6:
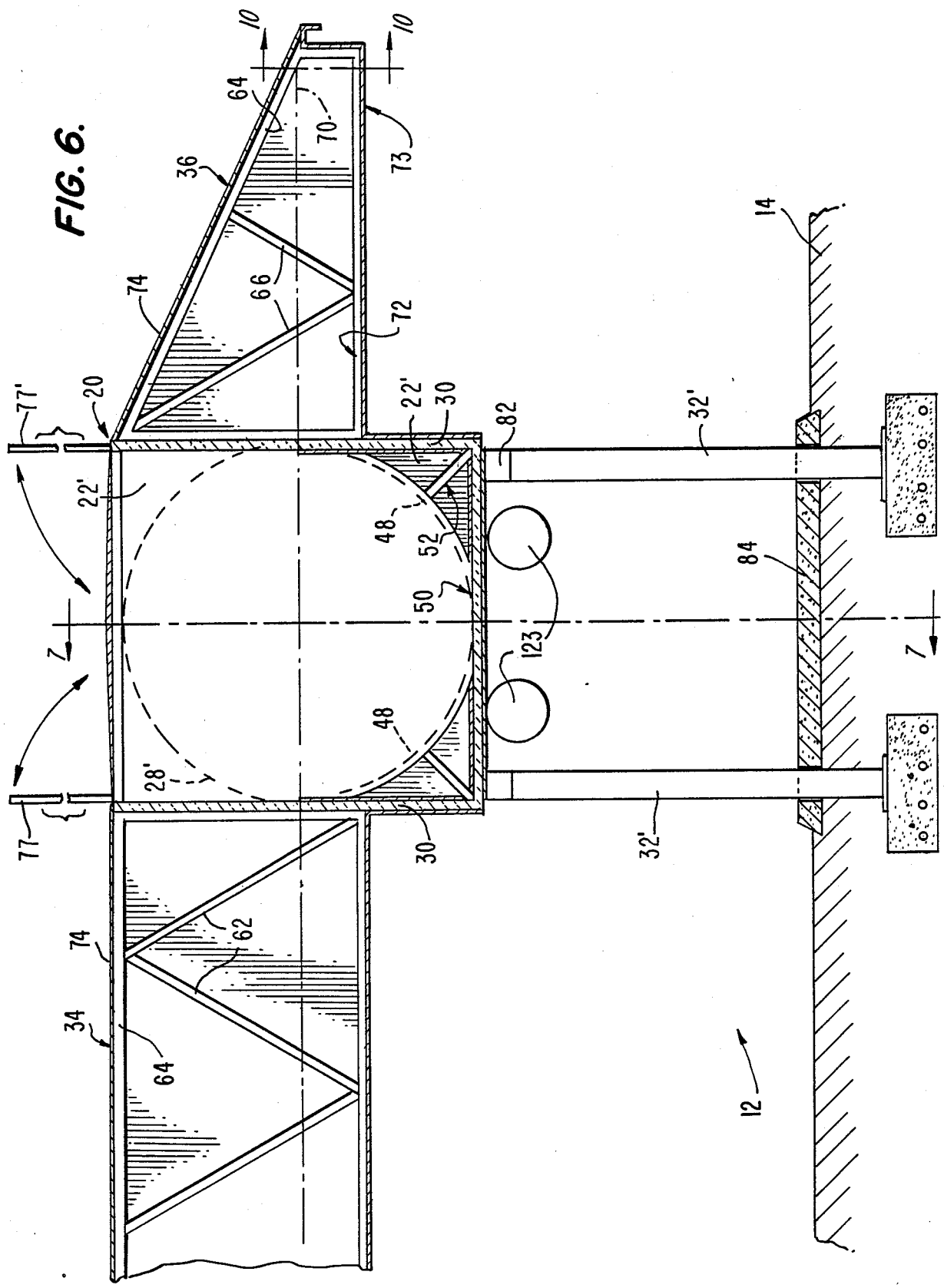
FIG. 6 is a fragmentary sectional view of one end of the filling station structure taken on line 6—6 of FIG. 4.

Canopy 18 is constructed of a series of horizontally running trusses 62 best seen in FIGS. 6 and 8. Each truss 62 is constructed of main truss frame elements 64 as seen in FIGS. 6 and 10. In addition, trusses 62 include some lighter diagonally-running truss members 66 (FIG. 6) running between the main frame elements 64 to provide the needed strength. The trusses are arranged to extend parallel to each other in a longitudinal direction, which happens to be transverse to the longitudinal axis of the vessels 20, 20', as best seen in FIG. 8. As also best seen in FIG. 8, the series of trusses 62, when arranged together, are interconnected by light-weight guys or perlins 67.

Trusses 62 provide the load bearing structure of the canopy. The covering of the canopy includes a lower roof portion 68 as best seen in FIGS. 1, 2 and 10. An upper edge 70 of the lower roof portion 68 is shown in phantom lines in FIG. 6. The bottom edge of canopy trusses 62 will generally correspond to a lower edge 72 of lower roof portion 68. The bottom of the canopy will be covered a sheet metal ceiling or soffit 73. Canopy 18 also includes an upper roof portion 74 composed of sloping, ribbed metal panels as are best seen in FIGS. 1, 2 and 3.

Part of the overall roof or top of the filling station structure 10 is of course provided by the tops of the fuel storage vessels 20, 20'. Specifically, each fuel storage vessel 20, 20' includes a lid 76. Lid 76 is movable or removable to, in turn, provide access to tanks 24, 24', 26, 26', 28, 28'. Of course, lid 76 will thus facilitate removal or replacement of the tanks with a crane if this should become necessary. Access to the compartments 22, 22' of the tanks 20, 20' can be further facilitated by dividing the lid 76 into two pivotally mounted halves 77, 77' as shown in FIG. 7.

Figure 9:
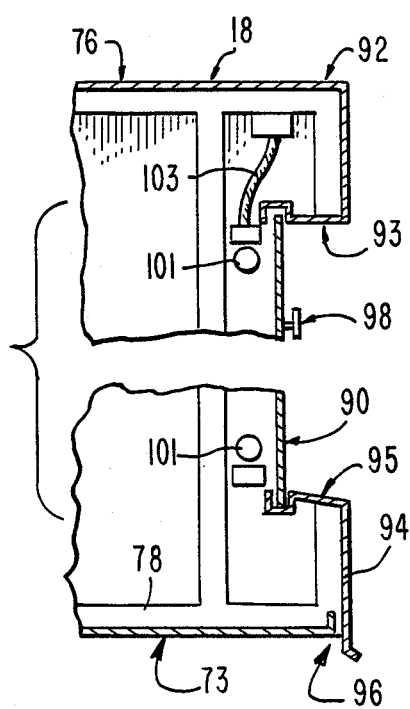
FIG. 9 is a fragmentary sectional view taken on the two sets of lines 9—9 of FIG. 7.

Referring to FIG. 7, the structure of the vessels, 20, 20' forming the compartments 22, 22' is also provided by a truss type construction. Specifically, vessels 20 are composed of vessel frame members 78 as seen in FIGS. 7 and 9. Lighter weight truss members 80 run diagonally between frame members 78 to strengthen and complete the truss type structure. These frame and truss members 78, 80, of course, are covered by insulated walls 30. The vessels 20, 20' formed thereby rest on elongated beams 82 made up of 10-inch square tubing. Beams 82, in turn, are supported in an elevated position above the ground by legs 32, 32' to hold the vessels 20, 20' in their elevated positions.

Figure 5:
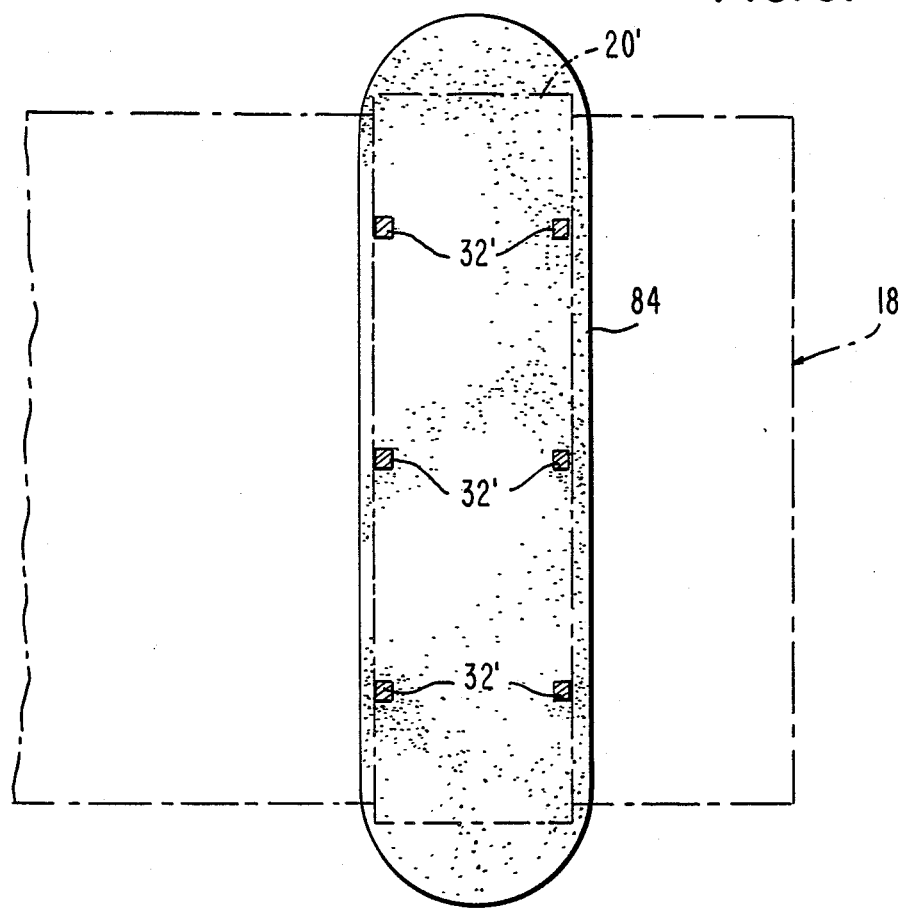
FIG. 5 is a plan view of one end of the filling station structure at the level of the fuel dispensing island and showing in phantom lines the position of the canopy and fuel storage vessel with respect to the island.

Legs 32, 32' extend down into and through raised concrete islands 84 (FIG. 5.) As is typical with filling stations, the fuel dispensers 38 are disposed on the islands 84. Also, the attendant's booth or booths 44, 44' are located on the islands (i.e., one on each island.) As can be most readily seen from FIGS. 2 and 5, vessels 20, 20' are disposed over islands 84 in registry therewith. That is, vessels 20, 20' virtually cover islands 84.

Legs 32, 32' which hold vessels 20, 20' in their elevated positions extend below ground level 14 to be anchored below ground in footings 86 (FIGS. 2, 3 and 7.) In addition, footings 86 may be further supported by a suitable bearing substrate 88.

At the longitudinal ends of each vessel 20, 20' are luminous panels 90 best seen overall in FIG. 1, the details of which are best seen in FIG. 9. Luminous panels 90 are for containing the name or service mark of the filling station, for advertising or for other display material. Referring specifically to FIG. 9, luminous panel 90 is housed by a formed metal frame 92 at each end of each fuel storage vessel 20, 20'. The formed metal frame 92 has an upper part 93 and a lower part 94. Lower part 94 includes, at its uppermost side, a sloping wall 95 for directing rainwater away from luminous panel 90 and away from the associated vessel 20 or 20'. In this same regard, lip 96 at the bottom of lower portion 94 also directs rainwater away from the luminous panel and associated vessel. Luminous panel 90 includes a frosted, plexiglass pane 98 for containing the signage. Frosted pane 98 is lighted from behind via lighting fixtures 101 which receive power via power cable 103.

In addition to the lighting of luminous panel 90, the lower roof portion 68 is lit via overhanging lights 105 as shown in FIG. 10. Light from the fixture 105 is directed onto a white or lightly colored surface 107 which may contain lettering or other signage. The overhanging light fixture 105 has at its lower end a lip 109 for directing rainwater away from the fixture and away from the interior of canopy 18. Also, the lightly colored surface 107 contains a lip 111 at its lower edge for directing rainwater away from the interior of canopy 18.

Figure 11:
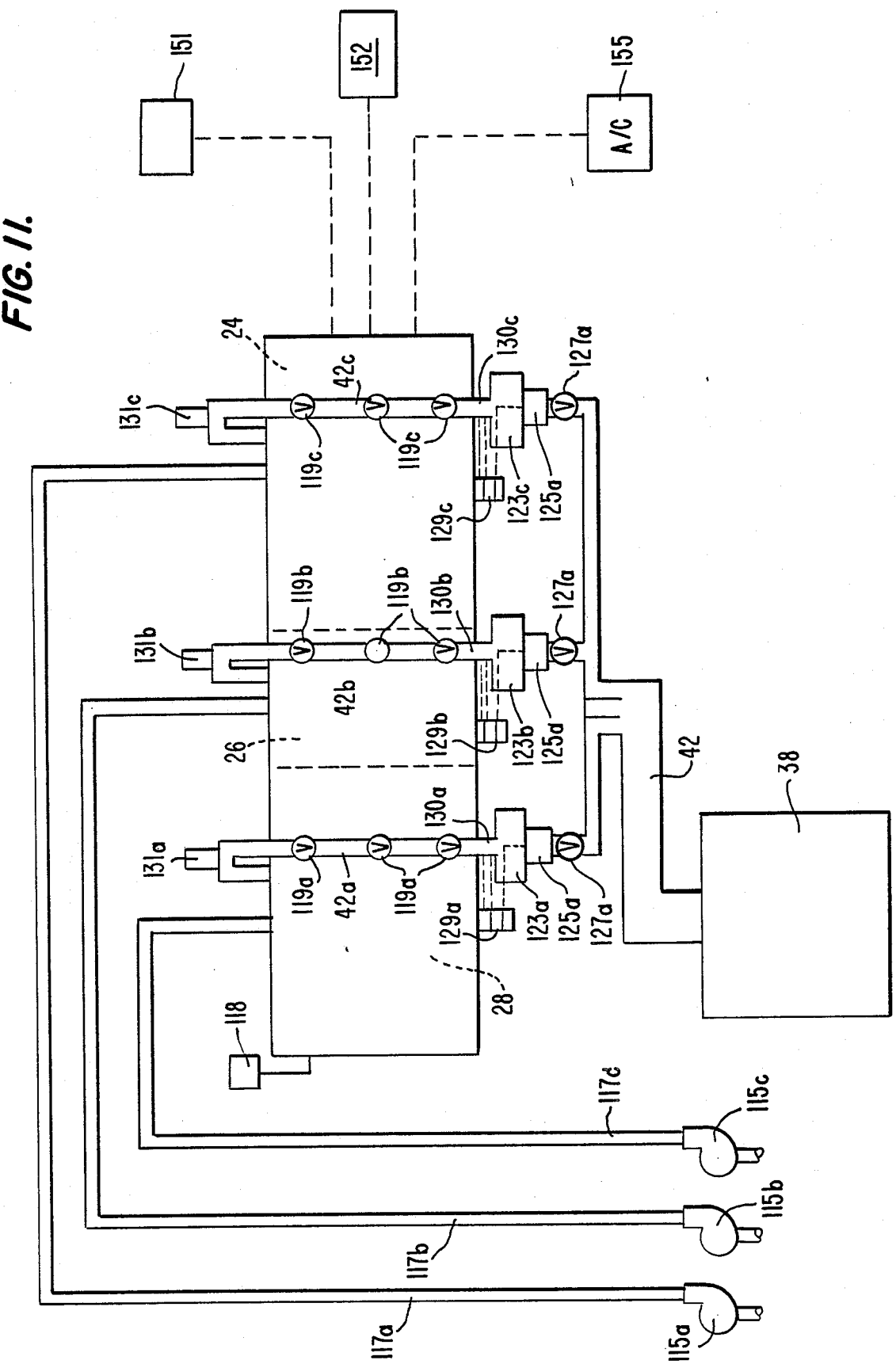
FIG. 11 is a schematic illustration depicting, inter alia, the fuel loading system and fuel dispensing system of the present invention.

Loading of fuel into tanks 24, 24', 26, 26', 28, 28' of vessels 20, 20' is accomplished via three centrifugal pumps 115a, 115b, 115c shown schematically in FIG. 11. The fuel passes from the pumps 115a, 115b, 115c through 4-inch lines 117a, 117b, 117c, respectively. Pumps 115a, 115b, 115c will be located to the side or rear of the filling station structure 10 to minimize the danger of fire if a pump should malfunction. A safety control shown schematically by reference character 118 is installed to automatically stop flow of gasoline when a tank has reached 90% of its capacity. That is, the automatic sensors shut off system 118, stops flow completely when the fuel is pumped into the tank up to a level of approximately 10 inches from the top. Fuel deliveries to the tanks 24, 24', 26, 26', 28, 28' are through the same type of system as used in aircraft fuel loading.

Dispensing of fuel to customers is via gravity siphoning through the top of the tanks 24, 24', 26, 26', 28, 28'. The siphoned fuel is fed through three gravity drop check valves 119a, 119b, 119c to ensure an even flow at all times, regardless of the head of the product in the tank. All siphoning from the main tanks 24, 24', 26, 26', 28, 28' will go into holding reserve tanks 123a, 123b, 123c in the form of 12-inch diameter, 14-foot long, round steel tubes under each of the larger tanks 24, 24', 28, 28' and 12-inch diameter, 8-foot long, round steel tubes under each smaller tank 26, 26'. Flow meters 125a, 125b, 125c are connected, respectively, to holding reserve tanks 123a, 123b, 123c. These are regulated by check valves and air eliminators, collectively indicated at 127a, 127b, 127c, so as to provide for a steady gravity pressure flow to meters at the dispensers 38. The holding tanks will hold a limited amount of fuel, so that when fuel is dispensed through the flow meters 125a, 125b, 125c, the fuel will have a steady, uninterrupted flow not effected by the level of the fuel in the main tanks.

An emergency shut-off system includes a valve and sensor arrangement schematically indicated by reference characters 129a, 129b, 129c in FIG. 11. These shut-off valves and sensors are disposed at each connection, i.e., one at the flowmeter 125a, 125b or 125c, one at the holding reserve tank 123a, 123b or 123c, and one at the feed line 130a, 130b, 130c to the holding reserve tanks. Between the holding reserve tanks 123a, 123b, 123c and the main tanks 24, 24', 26, 26', 28, 28' are siphoning starting bellows 131a, 131b, 131c which are used in the event that a tank goes dry or loses suction. The bellows 131a, 131b, 131c can be operated either automatically via a sensor, or manually.

There are no fittings or connections at the bottom of the tanks 24, 24', 26, 26', 28, 28'. The entire mechanical system is operated through a low voltage sensor system, and there are no pumping devices to dispense the gasoline into customers' tanks. The monitoring of fuel dispensed and fuel remaining in the tanks will be performed by the use of meters and gauges in the siphoning system which will also register the speed of flow of the fuel being dispensed from the tanks. The meter and gauges will also register the tank inventory at all times. In the case where fuel flows are registered but the fuel dispensers 38 are not being used, the sensors 129a, 129b, 129c will close all of the check valves 119a, 119b, 119c to avoid any leakage.

At no time will anyone be able to draw more than 24 gallons of fuel through any one flow meter 123a, 123b, 123c without resetting the dispensing system. That is, after 24 gallons have been dispensed, one of the sensors 129a, 129b, 129c will stop the flow of fuel to the dispensers 38. If a customer needs more fuel, the attendant at the station or kiosk 44, 44' will have to reset the system to enable additional flow of fuel.

With safety measures of this type, in the event of a broken hose or other dispensing mishaps, no more than 24 gallons of fuel can ever be spilled. In addition, the flow meters 125a, 125b, 125c regulate flow so that fuel can only be dispensed at a certain flow rate. Thus, if the flow rate becomes too high, the flow meters will cause the entire system to be shut off.

The robots 40, which serve as fuel dispensers, have multiple functions. They greet customers and give instructions in different languages with the push of buttons. In this regard, there is a chart (not shown) on the side of the robot with numbers and names of approximately 40 countries. The customer pushes a button to select whatever language he or she understands, and the robot will play audible instructions in that language. For instance, the robot will warn customers not to smoke.

The robots each also contain a smoke detector and will automatically call the fire department in the event of fire or smoke. It will call the police in the event of tampering or other difficulties and will call an ambulance in the case of an accident. The robot photographs the license plates of each car which stops in the filling station, stops all gas at the nozzle of the dispenser if there is a spill or in the event of any other emergency, and energizes sirens in case of a robbery. It also turns the filling station lights on and off at appropriate times. The robot 40 hands customers the gasoline hose. In particular, the hoses and nozzles are in the hands of the robots. When the customer indicates which grade of gasoline he or she wishes to purchase by selecting the proper button on the robot, the robot hands the correct nozzle to the customer, who then pulls the hose as far as needed to insert the nozzle into the fuel tank of his or her automobile. Also, the robot may activate a light, vapored stream of window cleaner while the tank is being filled.

Robot 40 has a bank card or gasoline credit card receptacle 137 for carrying out credit card transactions. It will make appropriate warning noises in the event that anyone tries to steal or vandalize the robot and it will use the left arm 139 defensively in the event anyone attempts to remove the robot from the base or to interfere with what the robot does. Each robot will also call the police in the event of a customer leaving the station without paying. The robot directs customers to self-service fuel dispensing sections by the use of a green light and to full service dispensing sections by the use of a blue light. It also bids goodbye to customers, thanks them for their patronage and provides other appropriate audible messages upon completion of a transaction.

Each robot has a pair of fire extinguishers which it will actuate in case of fire. Each robot also has a clock showing customers the correct time and showing the name of the town in which the station is located. In the chest area of the robot is a metering device 135 which shows the amount of fuel dispensed and the price of the fuel. Hoses and reels are also disposed inside the robot. When the customer desires to dispense fuel, and after the robot has handed the nozzle to the customer, the robot monitors the flow so that flow begins only after the nozzle has been inserted into the customer's gasoline tank.

In addition to the fire protection features already discussed, there is also throughout the canopy 18 a Foamite fire extinguishing system shown schematically by reference character 151 in FIG. 11. This system is activated by a robot 40 at the same time when the robot automatically summons the fire department upon detection of fire or smoke. Inside the steel vessels 20, 20' holding the fuel tanks 24, 24', 26, 26', 28, 28', there is another Foamite system (indicated schematically by reference character 152 in FIG. 11) which is separate and apart from the canopy fire protection system.

Additionally, in a separate area away from the filling station structure 30 is an air conditioning system shown schematically by reference character 155 in FIG. 11. This system will feed cool a in the summertime to vessels 20, 20'to keep the temperature at approximately 70°. In addition to adding a measure of safety, this also keeps the contents of the tanks 24, 24', 26, 26', 28, 28' from evaporating, thus eliminating the need for any vapor recovery and limiting the amount of air pollution. When ambient temperatures so permit, the vessels may be kept cool through a ventilator system including cool air inlets 157 and warm air inlets 159.

All lighting will be done with vapor-proof light bulbs and electrical connections. Indirect lighting (not shown), other than that which has already been described, will be connected to the steel columns which serve as legs 32, 32'. This lighting will be directed to the glossy white ceiling or soffit 73 of the canopy 18. The light will be reflected from the soffit 73 to the ground and around the pump islands.

The area around the pump islands and surrounding the filling station structure 30 will be covered with pavement at ground level 14. Paved areas outside of the filling station structure 30 will be lighted from area lights located at the perimeters of the property on which the structure is located. There will be an air compressor and air hose (not shown) located outside of comfort stations (also not shown) disposed away from the canopy filling station structure 10. Thus, there will be a minimum of electrical connections and conduits in the actual filling station structure 10 to thereby reduce the risk of fire.

While the present invention has been described in connection with a specific preferred embodiment, it will be understood that various different exemplary embodiments, variations, and modifications are possible. That is, the invention is not limited by the particular exemplary embodiment shown and described, and the invention covers all other possible embodiments, variations, and modifications within the scope of the appended claims.

What is claimed is:

1. A filling station structure comprising:
   (a) a canopy for covering an area for refueling vehicles, said canopy being disposed above ground level and above the level of the vehicles to be refueled; and
   (b) at least one fuel storage vessel holding fuel to be dispensed to the vehicles, said fuel storage vessel being contiguous with said canopy and being disposed above ground, whereby said canopy and above-ground fuel storage vessel together form an integrated, covered, above-ground filling station.

2. A filling station structure as defined in claim 1, wherein said fuel storage vessel includes a compartment with a plurality of different fuel tanks disposed in each compartment, whereby different types of fuels may be stored and dispensed from one storage vessel via the different fuel tanks therewithin and whereby said compartment serves as a firewall in the event of a leak in any one tank.

3. A filling station structure as defined in claim 1, including at least a pair of said storage vessels, each storage vessel being elevated above the ground by a plurality of legs, one part of said canopy extending between said pair of elevated storage vessels and supported in an elevated position by said storage vessels.

4. A filling station structure as defined in claim 3, wherein other parts of said canopy extend from said elevated storage vessels in cantilever fashion and are supported in elevated positions by said storage vessels.

5. A filling station structure as defined in claim 3, including a plurality of fuel dispensers disposed under each said storage vessel.

6. A filling station structure as defined in claim 5, including at least one siphon line extending between said storage vessel and said fuel dispensers to feed fuel to said fuel dispensers by a siphoning action.

7. A filling station structure as defined in claim 5, wherein said fuel dispensers are in the form of robots.

8. A filling station structure as defined in claim 5, wherein an attendant's booth is disposed under one of said storage vessels.

9. A filling station structure comprising:
   (a) an area at ground level for refueling motor vehicles;
   (b) an above-ground fuel storage vessel for holding fuel to be dispensed to the vehicles, said storage vessel being disposed adjacent said refueling area; and
   (c) an elevated canopy adjoining said fuel storage vessel and supported thereby, said canopy extending from said storage vessel and over said refueling area at a level such that said canopy extends over motor vehicles in the refueling area to thereby provide a roof over the motor vehicles.

10. A filling station structure as defined in claim 9, wherein said fuel storage vessel includes a compartment with a plurality of different fuel tanks disposed in each compartment, whereby different types of fuels may be stored and dispensed from one storage vessel via the different fuel tanks therewithin and whereby said compartment serves as a firewall in the event of a leak in any one tank.

11. A filling station structure as defined in claim 9, including at least a pair of said storage vessels, each storage vessel being elevated above the ground by a plurality of legs, one part of said canopy extending between said pair of elevated storage vessels and supported in an elevated position by said storage vessels.

12. A filling station structure as defined in claim 11, wherein other parts of said canopy extend from said elevated storage vessels in cantilever fashion and are supported in elevated positions by said storage vessels.

13. A filling station structure as defined in claim 11, including a plurality of fuel dispensers disposed under each said storage vessel.

14. A filling station structure as defined in claim 13, including at least one siphon line extending between said storage vessel and said fuel dispensers to feed fuel to said fuel dispensers by a siphoning action.

15. A filling station structure as defined in claim 13, wherein said fuel dispensers are in the form of robots.

16. A filling station structure as defined in claim 13, wherein an attendant's booth is disposed under one of said storage vessels.

17. A filling station structure comprising:
   (a) a canopy for covering an area for refueling vehicles, said canopy being disposed above ground level and above the level of the vehicles to be refueled; and
   (b) a fuel storage vessel of sufficient size and capacity to contain a volume of motor fuel adequate for refueling multiple motor vehicles as is customary for filling stations, said fuel storage vessel being for dispensing fuel to the vehicles, said fuel storage vessel being contiguous with said canopy and being disposed above ground, whereby said canopy and above-ground fuel storage vessel together form an integrated, covered, above-ground filling station.

18. A filling station structure as defined in claim 17, wherein said fuel storage vessel includes three fuel chambers which together have a capacity of 22,000 gallons of motor fuel.

19. A filling station structure comprising:
   (a) a canopy for covering an area for refueling vehicles, said canopy being disposed above ground level, said canopy having a pair of dimensions representing length and width; and
   (b) at least one fuel storage vessel for holding fuel to be dispensed to the vehicles, said fuel storage vessel being contiguous with said canopy and being disposed above ground, said fuel storage vessel being of a length which is at least as great as one dimension of said pair of dimensions of said canopy, said canopy and above-ground fuel storage vessel together forming an integrated, covered, above-ground filling station.

20. A filling station structure comprising:
   (a) an island near ground level;
   (b) a fuel dispenser in the region of said island;
   (c) a canopy for covering an area for refueling motor vehicles, which refueling area accommodates motor vehicles and which adjoins said island, said canopy being disposed above ground level and above the level of the motor vehicles to be refueled; and
   (d) at least one fuel storage vessel for holding motor fuel to be dispensed to the motor vehicles, said fuel storage vessel being disposed over said island in registry therewith, said fuel storage vessel virtually covering said island, said fuel storage vessel being contiguous with said canopy and being disposed above ground, whereby said canopy and above-ground fuel storage vessel together forming an integrated, covered, above-ground filling station.

* * * * *